Patented Mar. 22, 1949

2,464,811

UNITED STATES PATENT OFFICE 2,464,811

PURIFICATION OF CARBAZOLE

Thomas H. Insinger, Jr., Pittsburgh, Pa., assignor to Koppers Company, Inc., a corporation of Delaware No Drawing. Application June 20, 1944,
Serial No. 541,295

15 Claims. (Cl. 260—318)

The present invention relates to processes for separating carbazole from crude anthracene cake.

Crude anthracene cake obtained as a product of tar distillations comprises largely anthracene, phenanthrene and carbazole as close-boiling constituents. Considerable work has been done to devise economical processes for separating the said constituents. It is known to separate carbazole from crude anthracene cake by conversion of carbazole to an alkali metal compound thereof, for example, to potassium carbazolate, either by fusion of anthracene cake with potassium hydroxide at temperatures usually over 200° C. or by heating a solvent solution of crude anthracene cake in the presence of potassium hydroxide at temperatures of about 200° C. The resulting fused product can be vacuum distilled to separate, for example, anthracene, phenanthrene and unreacted carbazole from remaining carbazolate or in the case of a solvent solution, the insoluble potassium carbazolate can be separated from solvent solution containing said other constituents. The separated solid potassium carbazolate can thereafter be treated with steam, water or dilute mineral acid to convert it to a carbazole product. Plant scale yields have been relatively poor, where either of the above-described processes have been employed for producing an alkali metal carbazolate.

The present invention has for objects to provide improved processes for extracting carbazole from crude material containing the same wherein a metal carbazolate is formed in the extracting operation; to provide improved processes for preparing metal carbazolates, more particularly the alkali metal carbazolates; to avoid the formation of water in such processes; to avoid discontinuous phases in such processes; and to make it possible to obtain high yields in a relatively short time. A further object of the present invention is to provide improved processes for extracting carbazole from anthracene cake in which the aforestated objects are realized. Still another object is to provide processes in which the aforestated objects may be accomplished at comparatively low temperatures. Additional objects include such improvements and such other operative advantages or results as may be found to obtain in the processes of the invention as hereinafter described and claimed.

These objects are accomplished in the present invention by treating a crude carbazole-containing material such as coal tar fractions which contain carbazole together with anthracene, phenanthrene and the like, with an alcoholate as required to convert the carbazole to a metal carbazolate. In this treatment an exchange between the metal ion of the alcoholate and the imino hydrogen of the carbazole is effected, thus forming a metal carbazolate and the alcohol of the alcoholate.

Suitable metal ions for the alcoholates include the alkali and alkaline-earth metals and aluminum. Potassium is preferred because of its greater activity.

The reaction mixture can then be distilled to drive off alcohol, anthracene, phenanthrene, the metal carbazolate remaining in the still as residue. The solid, metal carbazolate can thereafter be hydrolyzed by treatment with steam, water, dilute mineral acid and preferably with co-produced or other alcohol to convert the same to carbazole. The reaction for producing the metal carbazolate is as follows:

$$C_{12}H_8NH + ROMe = C_{12}H_8NMe + ROH$$

where R is an aliphatic radical and Me is a metal that will react with carbazole such as an alkali metal, alkaline earth metal, aluminum and preferably an alkali metal.

It is preferred, because of the high yields obtainable, to prepare an alkali metal carbazolate, especially the potassium compound. To quickly effect reaction at a relatively low temperature, either one and preferably both of the reactants should be present in the reaction mixture in solvent diluents, for example, the alcoholate in a corresponding alcohol and the crude carbazole in a hydrocarbon solvent.

Potassium carbazolate is very easily hydrolyzed to form carbazole. It is preferred to treat the carbazolate with the alcohol that is distilled off during carbazolate formation, thereby forming insoluble carbazole in an alcohol solution of a reformed metal alcoholate. After removing carbazole the said alcoholate in alcohol can be reused to separate more carbazole from its crudes or by repetition of the present process it can be used to raise the purity of a semi-refined carbazole, obtained in the first instance from a crude carbazole to a purified, refined carbazole.

Within the scope of the invention rather wide variations in reagents can be employed. Crude anthracene cake or other carbazole crudes can be dissolved in such solvents, for example, as toluene, xylene, refined coke-oven solvent naphtha, decalin and tetralin. The temperature at which the reaction is carried out is usually the boiling point of the particular alcohol that is removed by distillation from the reaction mixture. Thus a solvent with an appropriately high boiling point is required. Of the possible metal alcoholates it has been found that almost quantitative conversion can be quickly and easily obtained with potassium alcoholates. The various potassium derivatives of aliphatic alcohols are effective, such as derivatives of methyl, ethyl, n-propyl, n-butyl, secondary butyl and isobutyl alcohol. The yield of potassium carbazolate appears to be independent of the number of carbon atoms of the alkyl group of the employed alcohol. The solid potassium alcoholates can be brought into direct contact with carbazole in a solvent, or a solution of the alcoholate in the corresponding alcohol may be used for bringing the carbazole into reaction with the alcoholate. In some instances, for example, with n-butyl alcohol, the solid potassium hydroxide can be dissolved in an excess of boiling alcohol and reaction can then be effected by adding this mixture to a warm solution of carbazole in an inert solvent, the formed water and alcohol being removed by distillation.

It is ordinarily more economical to produce potassium alcoholate at a temperature below 100° C. and react it with carbazole in a homogeneous liquid phase. It has been found, however, in the case of the higher-boiling alcohols, that the corresponding alcoholate can be mixed with melted, crude carbazole and that an efficient reaction takes place in liquid phase without benefit of a solvent or diluent for the carbazole, or alcoholate. The formed alcohol is then removed by distillation or solvent extraction to precipitate the carbazolate.

The following specific examples are illustrative of the results obtainable by operation of the present improvement.

Example 1

A crude product comprising equal parts of carbazole, anthracene and phenanthrene dissolved in toluene was heated with a solution of potassium ethylate in ethyl alcohol. The solvent ethyl alcohol along with the ethyl alcohol produced in the reaction was distilled from the mixture. The carbazolate thus precipitated was filtered from the still residue while hot to separate the solid reaction product from toluene solution of anthracene and phenanthrene. Thereafter the potassium carbazolate was heated with ethyl alcohol, and the resulting carbazole filtered from potassium ethylate in ethyl alcohol. The filtered, washed and dried filter cake was carbazole having a purity of 96% and represented a yield of over 95% of the carbazole present in the initial crude.

Example 2

Equal portions of carbazole (96% purity) previously prepared in Example 1 were separately dissolved in toluene and the individual portions admixed respectively with solid potassium ethylate, potassium n-propylate and potassium n-butylate, the resulting mixtures being heated to vaporize and remove the corresponding alcohol therefrom. Thereafter the solid potassium carbazolate was separated by filtration from hot solvent and the yields thereof were respectively 99%, 100% and 98% of that theoretically possible. Carbazole having a purity of about 99% was obtained from said carbazolates by treating the same with ethyl alcohol, filtering and drying.

Example 3

Equal portions of carbazole (96% purity) previously prepared in Example 1 were separately dissolved respectively in toluene, xylene, refined coke-oven solvent naphtha (boiling range 160° C. to 180° C.) and decalin. Equal portions of potassium ethylate in ethyl alcohol were added thereto and reaction effected to form potassium carbazolate by heating to maximum temperatures respectively of 98.6° C., 140° C., 175° C. and 195° C. After separation by filtration the yields of potassium carbazolate were respectively 99%, 98%, 98% and 100% of that theoretically possible. Comparable treatment of said carbazole dissolved respectively in xylene and refined solvent naphtha, with sodium ethylate gave yields of sodium carbazolate of 25% and 22% of that theoretically possible. Carbazole having a purity of about 99% was obtained from said carbazolate by treating said carbazolates with ethyl alcohol, filtering and drying.

The hereinabove given results in the specific examples illustrate some of the methods for separating a semi-refined carbazole from a crude product and then obtaining a purified, refined product therefrom. Wide variations in operating technique are possible and are empirically determinable depending largely on the physical properties of the alcoholate and the solvent being employed. The process of invention can be utilized to equal advantage in those other instances where a metal ion, for example, an alkali metal, an alkaline earth metal, or aluminum can become a substituent for an imino hydrogen in a compound, as is the case with carbazole.

The preferred form of the invention having been thus described what is claimed as new is:

1. The process of claim 8 in which regeneration of carbazole is effected by hydrolyzing the separated metal carbazolate with an alcohol and separating the purified carbazole therefrom.

2. The process of claim 9 in which carbazole is regenerated from the separated carbazolate by treating with alcohol to precipitate carbazole and form an alcohol solution of an alcoholate and filtering to separate carbazole from said alcoholate and alcohol.

3. The process of claim 2 in which the alkali metal is potassium.

4. The process of claim 11 in which carbazole is regenerated from the separated carbazolate by treating with alcohol to precipitate carbazole and form an alcohol solution of an alcoholate and filtering to separate carbazole from said alcoholate and alcohol.

5. A process for separating carbazole from crudes comprising carbazole, anthracene, and phenanthrene, comprising: heating a solution comprising the crude dissolved in toluene and potassium ethylate dissolved in ethyl alcohol to a temperature of about 100° C. to precipitate potassium carbazolate and distill off ethyl alcohol; separating potassium carbazolate from toluene solution of anthracene, and phenanthrene; treating the potassium carbazolate with alcohol to precipitate carbazole and filtering the carbazole from the solution.

6. A process for separating carbazole from a tar fraction comprising carbazole, anthracene, and phenanthrene, comprising: distilling a mixture of said tar fraction and an alkali metal alcoholate to a temperature that is sufficient both to effect reaction between the carbazole in said tar fraction and alcoholate and to precipitate metal carbazolate by distilling off the alcohol formed by the reaction; separating solid alkali metal carbazolate precipitate from remaining liquid tar fraction; treating separated alkali metal carbazolate with alcohol to form carbazole and alkali metal alcoholate said carbazole being precipitated; separating refined carbazole from said alkali metal alcoholate; admixing said alkali metal alcoholate with further quantities of said tar fraction and repeating the hereinabove described process for carbazole separation.

7. A process for producing highly refined carbazole from a coal tar fraction comprising carbazole, anthracene and phenanthrene, the said process comprising: heating a solution comprising the coal tar fraction in an inert solvent and an alkali metal ethylate dissolved in ethyl alcohol to a temperature that is sufficient both to effect reaction between the carbazole in said tar fraction and said alkali metal ethylate forming thereby precipitated alkali metal carbazolate and to distill off the ethyl alcohol formed by their reaction; separating the precipitated alkali metal carbazolate from the solution; treating the alkali metal carbazolate with ethyl alcohol to precipitate a semi-refined carbazole and form an alcohol solution of alkali metal ethylate; adding the precipitated semi-refined carbazole to a further quantity of inert solvent and of alkali metal ethylate in ethyl alcohol at the above prescribed temperature and precipitating alkali metal carbazolate; separating the precipitated carbazolate and treating it with alcohol to produce a highly refined carbazole; and filtering to separate highly refined carbazole from alkali metal ethylate in the alcohol.

8. In a process for the recovery of carbazole from associated anthracene in which the carbazole is converted to a metal carbazolate, separated in the carbazolate form from the anthracene and regenerated from the separated carbazolate, the improvement which comprises heating crude carbazole containing such anthracene with a metal alcoholate to a temperature that is sufficient to evaporate alcohol formed by reaction between the carbazole and the metal alcoholate, separating out the metal carbazolate and regenerating carbazole from the separated metal carbazolate.

9. In a process for recovering carbazole from crudes comprising carbazole, anthracene and phenanthrene in which the carbazole is converted to a metal carbazolate, separated in the carbazolate form from the remaining material and regenerated from the separated carbazolate, the improvement which comprises heating the crude in an inert solvent containing also an alkali metal alcoholate in alcohol to a temperature that is sufficient to precipitate the carbazolate and to evaporate the alcohol in which the alcoholate was dissolved and also the alcohol formed by the reaction, separating the precipitated alkaline metal carbazolate from the solution, and regenerating carbazole from the separated alkaline metal carbazolate.

10. The process of claim 9 in which the alkali metal is potassium.

11. The process of claim 9 in which the first named alcohol and the alcoholate have the same alcohol radical.

12. In a process for the recovery of carbazole from crude carbazole-containing material in which the carbazole is converted to a metal carbazolate, separated in the carbazolate form from the remaining material and regenerated from the separated carbazolate, the improvement which comprises effecting said conversion by means of an exchange reaction between a metal alcoholate and the carbazole.

13. A process for making metal carbazolates which comprises heating carbazole with a metal alcoholate and distilling off alcohol of formation.

14. A process for making metal carbazolates which comprises heating carbazole with a metal alcoholate in the presence of added alcohol and distilling off the added alcohol and the alcohol of formation.

15. A process for making metal carbazolates which comprises heating a solution of carbazole and a metal alcoholate in a mutual solvent and distilling off the alcohol of formation.

THOMAS H. INSINGER, Jr.

REFERENCES CITED

The following references are of record in the file of this patent:

UNITED STATES PATENTS

| Number | Name | Date |
|---|---|---|
| 1,404,055 | Portheim | Jan. 17, 1922 |

OTHER REFERENCES

Jour. Amer. Chem. Soc., (1922), vol. 44, pages 135–140.

Fischer et al., "Chemie der Pyrrols," vol. II, Part I, Leipzig, (1937), page 420.